Dec. 29, 1953     E. J. MANSFIELD     2,664,303
CONE AND SOCKET PIPE JOINT WITH COOPERATING LOCKING LUG
Filed Dec. 4, 1950
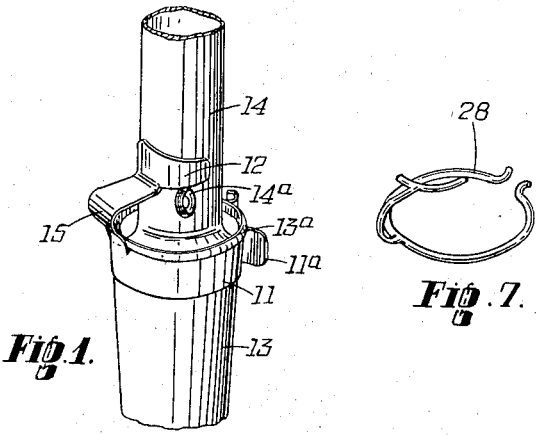
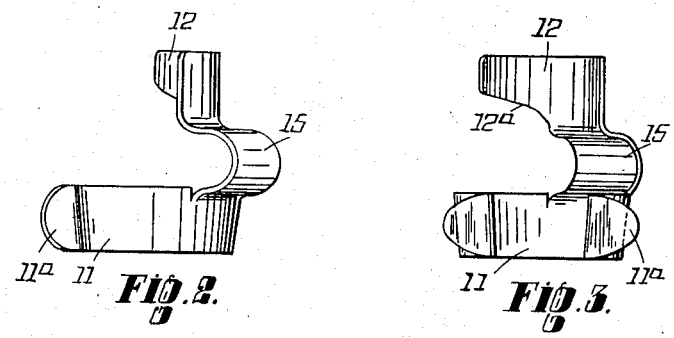
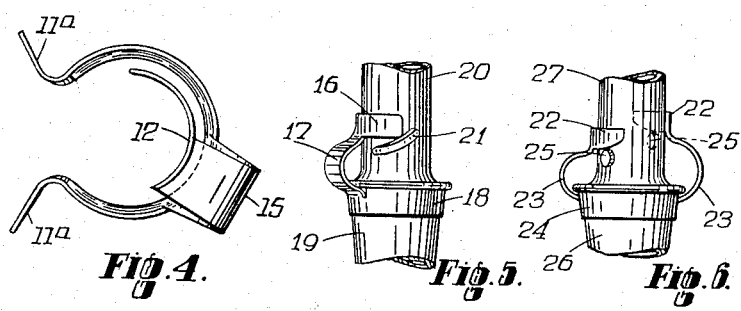
Inventor
Ernest John Mansfield
By Patented Dec. 29, 1953

2,664,303

UNITED STATES PATENT OFFICE 2,664,303

CONE AND SOCKET PIPE JOINT WITH COOPERATING LOCKING LUG

Ernest John Mansfield, Lower Sydenham, London, England, assignor to W. Edwards & Co. (London) Limited, London, England, a British company Application December 4, 1950, Serial No. 198,933

4 Claims. (Cl. 285—175)

This invention concerns cone and socket joints in pipe work and hollow apparatus, especially of glass.

Known methods of holding the component parts of cone and socket joints in engagement are not entirely satisfactory, since the holding means are often unreliable and insecure. For example, one method requires two glass hooks to be affixed to each component part to accommodate two coil springs which hold the said parts together, but it has been found that if the apparatus employing the joint is subjected to slight pressure, the springs become extended, allowing the joint to work loose. This type of holding means is, in addition, expensive in manufacture.

It is an object of this invention to provide a relatively simple clip arrangement whereby cone and socket joints may be prevented from coming apart.

According to this invention two apparatus or pipe components having complementary cone and socket joint portions are retained in jointed condition by a clip engageable around one component and presenting a helically extending surface or a projection engageable with a projection or a helically extending surface on the other component. By relative rotation of the clip and the component having the projection or helically extending surface adjustment of holding pressure may be effected.

A clip is preferably at least partially resilient whereby a resiliently applied holding pressure may be obtained.

In one preferred form of clip which may be made from a single piece of sheet metal there is a part circular band connected to an abutment or hook presenting an edge which extends helically relative to the band.

The band is shaped so as to be engageable around the outside of a conical socket and retained thereon by the spring action of the metal forming the band.

The outwardly projecting rim at the end of the socket prevents displacement of the band in an axial direction along the component having the socket. The band may extend around about 300° to 320° and may have its ends doubled over to provide smooth engagement during application to the smaller diameter region of the conical socket.

The hook is curved with an internal radius approximately equal to the external diameter of the region of the other component immediately beyond the projection thereon. It may extend around about 180°.

The edge nearest to the band portion is slightly helical, that is to say at one end it may be about ½₀ to ⅛ of an inch nearer to the plane containing the nearest edge of the band portion than at its other end. The hook is united to the band by a doubled connecting portion which extends in a radially outward direction.

The invention will be described further by way of example with reference to the accompanying drawings in which:

Fig. 1 is a fragmentary perspective view showing a preferred form of clip arranged so as to retain two apparatus or pipe components in jointed condition, Fig. 2 is an elevation of the clip on an enlarged scale as viewed from one side thereof, Fig. 3 is a similar elevation viewed from the rear, Fig. 4 is a corresponding plan, Fig. 5 is a fragmentary perspective view showing a further form of clip arranged to retain two apparatus or pipe components in jointed condition, Fig. 6 is a similar view of yet a further form of clip and, Fig. 7 is a perspective view of a clip made of wire.

The clip which may be made from a single piece of sheet metal comprises a part circular band 11 connected to an abutment or hook 12 presenting an edge 12a which extends helically relative to the band. The band is shaped so as to be engageable around the outside of a conical socket 13 and retained thereon by the spring action of the metal forming the band. The outwardly projecting rim 13a at the end of the socket prevents displacement of the band in an axial direction away from the socketed component.

The band 11 extends around approximately 300° and has end portions 11a which are bent over outwardly to provide a smooth engagement during application to and removal from the smaller diameter region of the conical socket. The hook 12 is curved with an internal radius approximately equal to the external diameter of the region of the other component 14 immediately beyond the projection 14a thereon. This hook extends in engagement with the surface of the component 14 around rather less than 180°.

The hook 12 is united to the band 11 by doubled connecting portion 15 which extends in a radially outward direction. This doubling provides resilience longitudinally of the joint axis, maintaining the cone and socket in positive engagement even when the apparatus is subject to slight pressure.

Fig. 5 shows an alternative embodiment in which an abutment 16 is connected to a part circular band 18 by the doubled connecting portion 17, the abutment 16 serving as a projection adapted to engage with a further abutment 21 provided on component 20. When the band 18 is engaged around component 19 the abutment 21 presents a helically extending surface relative to the band 18.

In a further form of clip, shown in Fig. 6, two abutments 22, 22 are connected to a part circular band 24 by means of doubled connecting portions 23, 23. The part circular band is engageable around a component 26 and when rotated relatively to component 27, the abutments 22 engage with their helically extending surfaces one on each of two projections 25 oppositely disposed to one another on component 27.

The clip generally designated 28 in Fig. 7 is similar to the clip shown in Figs. 1 to 4 but is constructed of wire instead of sheet metal.

I claim:

1. A joint for fastening together two apparatus components, comprising complementary cone and socket joint portions formed on said components, an abutment presented by one of said components, a clip and a rim at the edge of the socket joint portion, said clip being formed integrally from a single piece of resilient material and comprising a part-circular band, a part-circular abutment disposed coaxially with but of lesser diameter than said band and spaced apart from said band axially of said cone and socket joint portions, and an at least partially resilient, substantially U-shaped bent portion extending from one edge of and substantially perpendicular to said band to connect said band and said abutment, said part-circular band being detachably engageable around said socket joint portion and said abutment being adapted to engage over a further abutment formed on the second component, one of said abutments presenting a short helically extending surface with respect to said band when said band is engaged around the socket joint portion, whereby, since axial displacement of said band is prevented by said rim, said first-named abutment is urged axially along the joint to deform said bent portion when said clip is rotated relative to said second component into a locking position, said components at all other relative positions of said clip and said second component not being held in positive engagement by said clip, and therefore easily being separable.

2. A joint for fastening together two apparatus components as set forth in claim 1 in which the abutment provided by the clip presents a relatively short edge which extends helically with respect to said part-circular band and the abutment on the second component is a projection over which said edge is adapted to engage when said clip is rotated relative to said second component into the locking position.

3. A joint as set forth in claim 1 in which said second component has formed thereon a surface extending helically with respect to said part-circular band when said band is engaged around said first-named component, and the abutment provided by the clip serves as a projection adapted to engage over said surface when said clip is rotated relative to said second component into the locking position.

4. A joint for fastening together two apparatus components, comprising complementary cone and socket joint portions formed on said components, a plurality of abutments presented by one of said components, a clip and a rim at the edge of the socket joint portion, said clip being formed integrally from a single piece of resilient material and comprising a part-circular band, a plurality of part-circular abutments presenting a plurality of helically extending surfaces, and a plurality of at least partially resilient, substantially U-shaped bent portions extending from one edge of and substantially perpendicular to said band to connect said band and said part-circular abutments, said latter abutments being disposed co-axially with, but of lesser diameter than, said band and spaced apart therefrom axially of said cone and socket joint portions, said part-circular band being detachably engageable around the socket joint portion and said abutments being adapted to engage over said first-named abutments whereby, since axial displacement of said band is prevented by said rim, said part-circular abutments are urged axially along the joint to deform said bent portions when said clip is rotated relative to said second component into a locking position, said components at all other relative positions of said clip and said second component not being held in positive engagement by said clip, and therefore easily being separable.

ERNEST JOHN MANSFIELD.

References Cited in the file of this patent

UNITED STATES PATENTS

| Number | Name | Date |
|---|---|---|
| 601,444 | Lotstrom | Mar. 29, 1898 |
| 764,881 | Colin | July 12, 1904 |
| 874,378 | Allen | Dec. 24, 1907 |
| 936,566 | Rosendahl | Oct. 12, 1909 |
| 1,052,288 | Sisler et al. | Feb. 4, 1913 |
| 1,218,539 | Farlow | Mar. 6, 1917 |
| 1,372,628 | Mueller et al. | Mar. 22, 1921 |
| 1,787,734 | Rowling | Jan. 6, 1931 |
| 1,801,872 | Morston | Apr. 21, 1931 |
| 1,810,091 | Siegle | June 16, 1931 |
| 2,218,756 | Knoerzer | Oct. 22, 1940 |